(12) United States Patent
Yan et al.

(10) Patent No.: US 7,555,284 B2
(45) Date of Patent: Jun. 30, 2009

(54) METHOD AND A DEVICE FOR PROVIDING DIGITAL TICKETS IN A MOBILE COMMUNICATIONS ENVIRONMENT

(75) Inventors: Zheng Yan, Espoo (FI); Mia Lähteenmäki, Helsinki (FI); Piotr Cofta, Dublin (IE)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 10/514,003

(22) PCT Filed: May 20, 2003

(86) PCT No.: PCT/IB03/01941

§ 371 (c)(1),
(2), (4) Date: May 26, 2005

(87) PCT Pub. No.: WO03/098503

PCT Pub. Date: Nov. 27, 2003

(65) Prior Publication Data

US 2005/0240484 A1 Oct. 27, 2005

(30) Foreign Application Priority Data

May 21, 2002 (GB) ................................. 0211734.9

(51) Int. Cl.
*H04M 1/66* (2006.01)
*G06Q 30/00* (2006.01)

(52) U.S. Cl. .................... 455/411; 455/550.01; 455/566

(58) Field of Classification Search ................ 455/411, 455/412.1, 414.1, 550.1, 566, 556.1, 556.2; 705/6, 39, 26
See application file for complete search history.

(56) References Cited

U.S. PATENT DOCUMENTS

2001/0018660 A1* 8/2001 Sehr .............................. 705/5

FOREIGN PATENT DOCUMENTS

| WO | WO 98/03005 | 1/1998 |
|---|---|---|
| WO | WO 99/55067 | 10/1999 |
| WO | WO 01/41081 A2 | 6/2001 |
| WO | WO 01/80047 A2 | 10/2001 |
| WO | WO 01/97175 A1 | 12/2001 |

OTHER PUBLICATIONS

PCT International Search Report (as published), International Application No. PCT/IB03/01941, Date of Completion of Search—Sep. 1, 2003.

* cited by examiner

*Primary Examiner*—Melur Ramakrishnaiah
(74) *Attorney, Agent, or Firm*—Locke Lord Bissell & Liddell LLP

(57) ABSTRACT

A handheld device (100) is capable of communicating wirelessly with a ticket issuer (200) through a network (300) or by using a short-range link such as Bluetooth, IrDA, or the like. A ticket is purchased using a payment system (400). A user selects an image from a data store (120) and transmits it to the ticket issuer (200) along with data associated with the requested ticket. This data may comprise identification data of the user and/or the device (100), data concerning a requested validity of the ticket, data concerning the payment method and/or an optional reservation number. The ticket issuer (200) receives the request then transmits to the user a template, which the user then fills in before transmitting payment data, the completed template and the selected image from the user device (100) to the ticket issuer (200), as one or more SMS and/or MMS messages. If the data is verified as satisfactory, the ticket is then created by the ticket issuer (200) and visible and/or invisible watermarks are embedded into the image. The processed picture/image and the template are combined with additional data to generate a valid image digital ticket for the ticket user, which is then sent to the user or to an address or device which the user has given.

12 Claims, 4 Drawing Sheets

Figure 1:
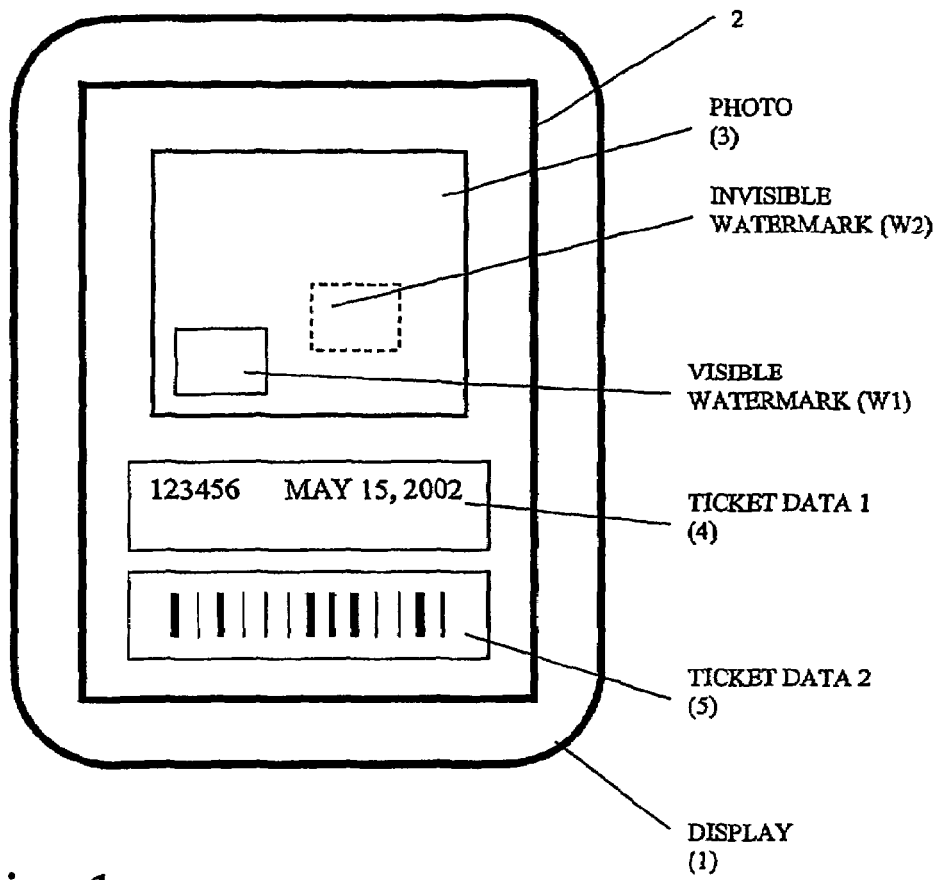

METHOD AND A DEVICE FOR PROVIDING DIGITAL TICKETS IN A MOBILE COMMUNICATIONS ENVIRONMENT

This invention relates to a ticketing system and has particular application to mobile networks.

A digital ticket is a certificate that guarantees certain rights for the ticket owner. There are many applications for digital tickets. Some digital tickets, e.g., an electronic stamp, electronic coupon or voucher have already been developed. However, most of them are digital textual tickets in which rights of the ticket owner are described by text.

Digital tickets have now been proposed for use in mobile terminals. Mobile terminal capabilities can allow the purchasing, downloading and viewing of digital tickets at anytime and anywhere, which is advantageous not only to users, but also to ticket issuers. Users would be able to view the ticket on their mobile terminals and contact the ticket issuer or service provider easily and ticket issuers would be able to push information to the users directly and thereby inform them about changes or other details after purchase.

One difficulty with digital tickets is that, because they are suitable for delivery over networks, it is easy for them to be altered, pirated or distributed without change and control. The digital copy of the ticket can be the same as the original, which makes ticket verification at redemption more difficult. Many solutions have been proposed for protecting digital tickets, but the extra protection often makes digital ticket systems too complicated, particularly for mobile applications, and thereby restricts their use.

The present invention addresses these difficulties and disadvantages.

In a first aspect the invention provides amethod of providing one or more digital tickets in a mobile communications environment to a user, each ticket giving rights for receiving a service, the method comprising: te user transmitting a request for said digital ticket from a mobile handheld communications device to a ticket issuer; te ticket issuer responding to the request by transmitting a ticket template to the user; the user transmitting the filled template and a digital image to the ticket issuer; the ticket issuer creating a digital ticket comprising the digital image, user data from the filled template, ticket validity data, and ticket verification data; the ticket issuer transmitting the created ticket to the or another user; and the or another user receiving and storing the digital ticket in their mobile handheld communications device.

The ticket verification data preferably is embedded in the received digital image by the ticket issuer as one or more watermarks, which may be invisible and/or visible.

Te digital image preferably is a digital image of the user requesting for the digital ticket.

A second aspect of the invention provides a computer program in the form a signal or a product on a computer readable medium, for enabling a wireless handheld device in a mobile communication environment to receive a digital ticket for obtaining rights to a service, the program comprising instructions for controlling a device: to transmit a request for the digital ticket to a ticket issuer; to receive a template for the said digital ticket from the ticket issuer; to fill the said template with data relating to the wireless handheld device; to fill the said template with data relating to the user of the wireless handheld device; to transmit the filled template to the ticket issuer; to select a digital image from a first storage in the said wireless handheld device; to transmit the selected digital image to the ticket issuer with a reference to the filled template; to receive the digital ticket from the ticket issuer; to store the received digital ticket in a second storage in the wireless handheld device; and to display the stored digital ticket on a display of the said wireless handheld device.

A third aspect of the invention provides a wireless handheld device operable in a mobile communication environment, the device comprising: a user interface for entering a request for a digital ticket; a transmitter coupled to the user interface for sending the request for the digital ticket to a ticket issuer; a receiver coupled to the user interface for receiving a template for the digital ticket as a response to the request; means for filling the received template with data relating to the user of the wireless device and with data relating to the wireless device; said transmitter being arranged to send the filled template to the ticket issuer, means for selecting an image from a first storage in the wireless device; said transmitter being arranged to send the selected image to the ticket issuer with a reference to the filled template; said receiver being arranged to receive the requested digital ticket from the ticket issuer; means for storing the received digital ticket in a second storage in the wireless device; means for retrieving the stored digital ticket from the second storage; a display for displaying the retrieved digital ticket; and a processor coupled to the said transmitter, receiver, first and second storage, display, filing means, storing means and user interface for processing data between the said elements.

The invention also provides a digitally encrypted ticket for use in a mobile network for display on a mobile telecommunications device wherein the ticket comprises image data that has been digitally watermarked. The watermarking may be visible or invisible. The image data may include an image of the user.

Figure 2:
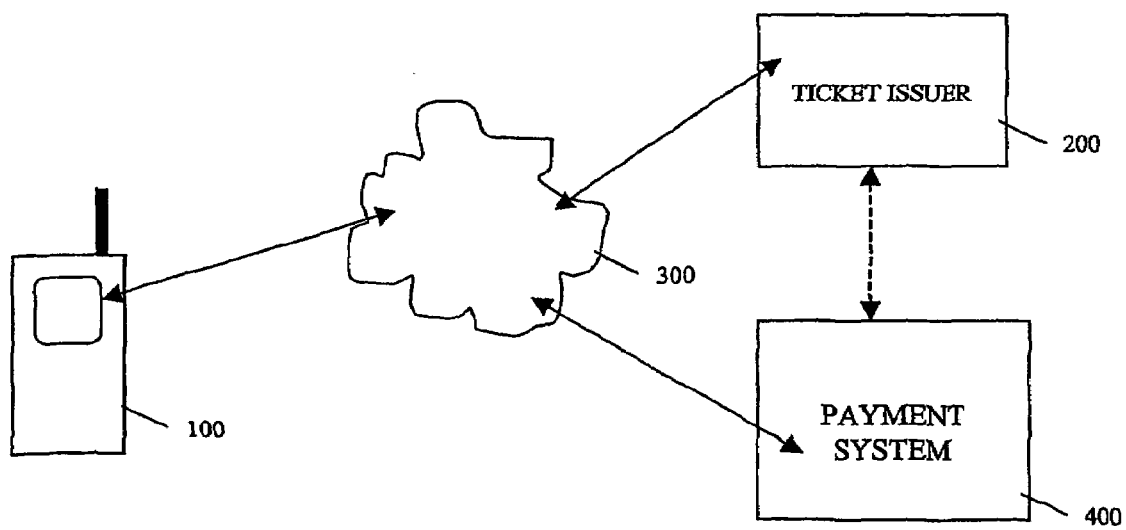
Figure 3:
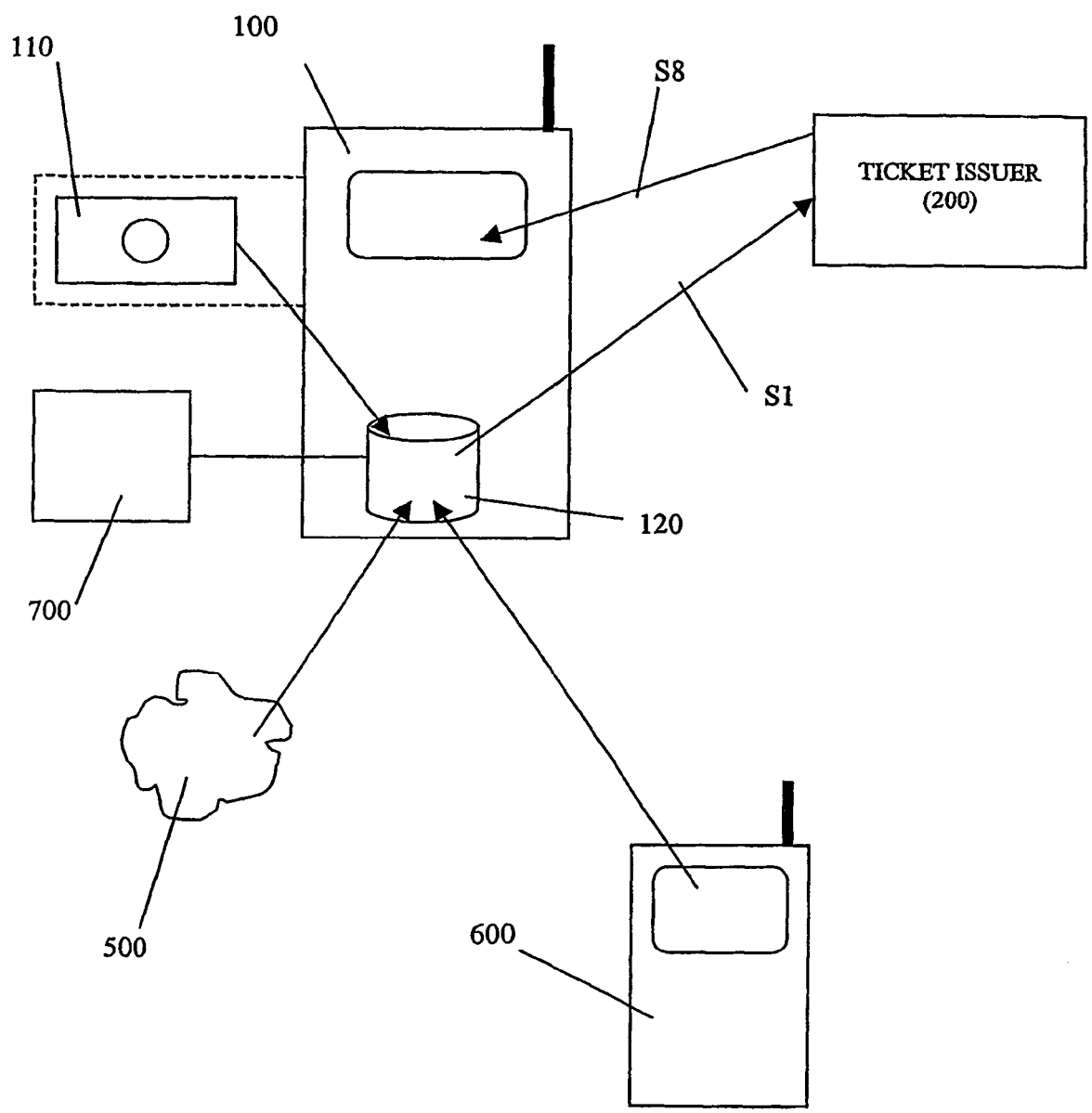
Figure 4:
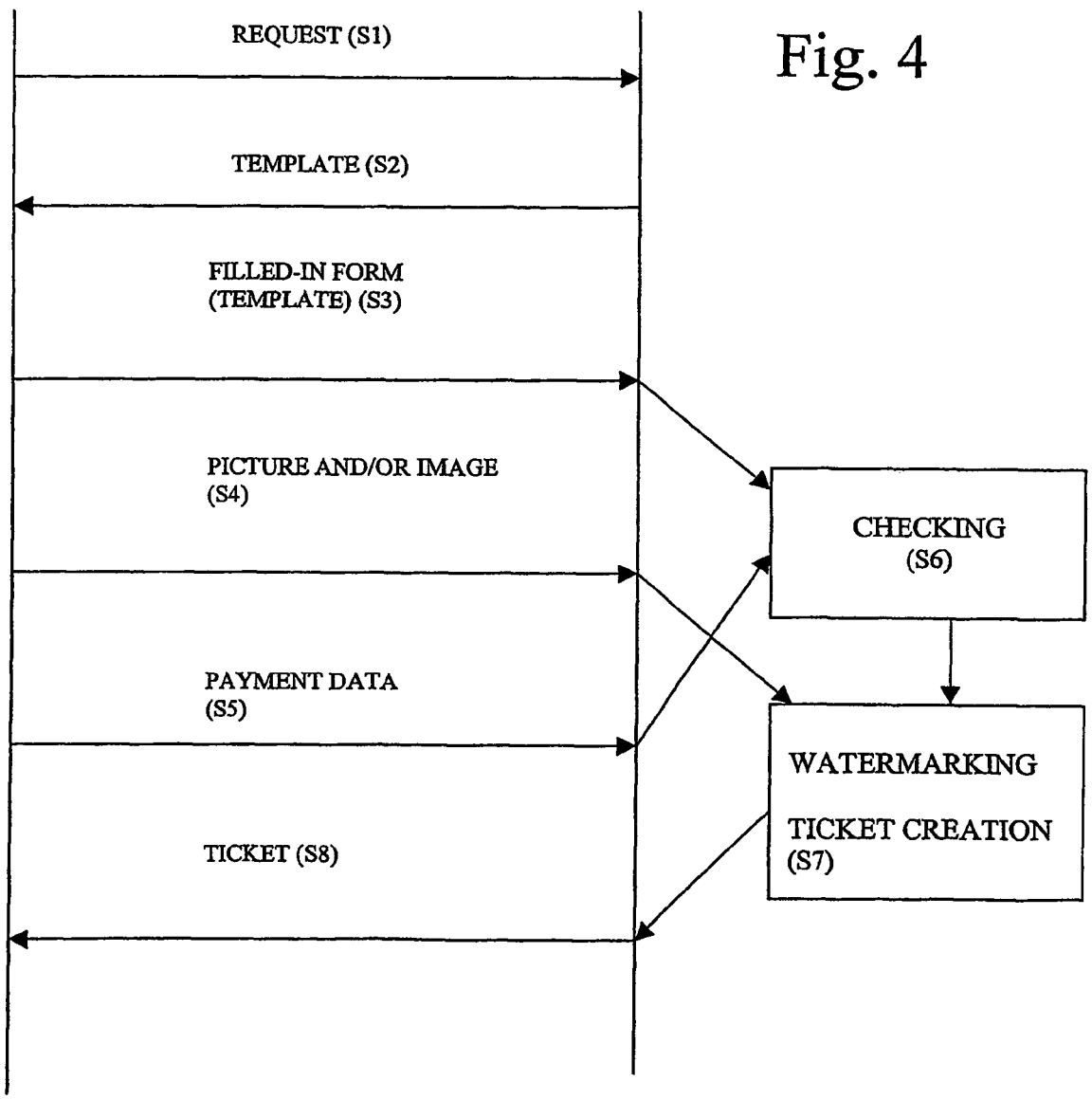
Figure 5:
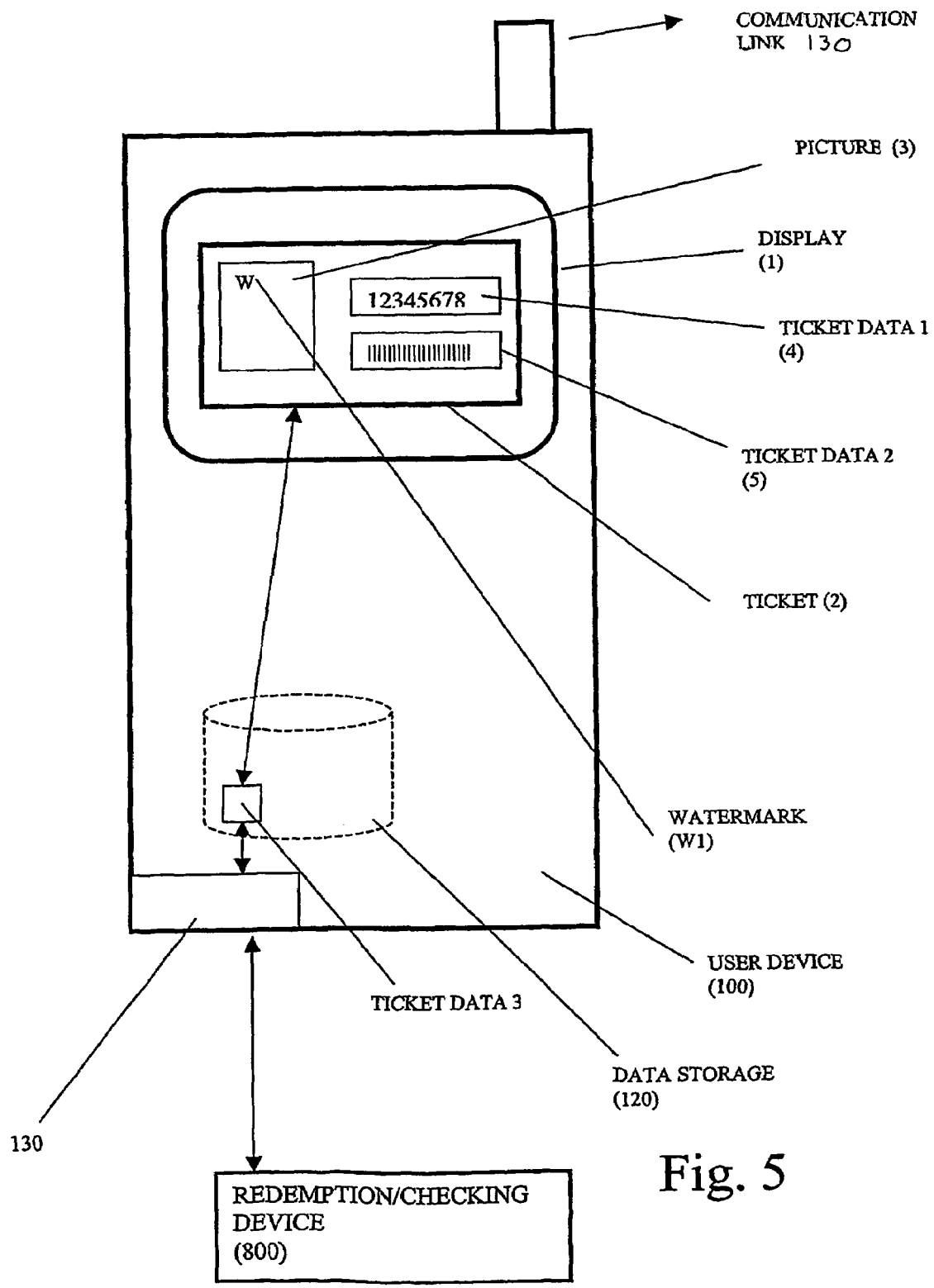

In order that the invention may be more fully understood an embodiment thereof will now be described by way of illustrative example with reference to the accompanying drawings in which:

FIG. 1 is a schematic illustration of the a ticket when displayed on a user device, in accordance with the invention, FIG. 2 is a schematic block diagram of a network established between a mobile user device and a device for issuing tickets, FIG. 3 is a more detailed illustration of the network shown in FIG. 2, FIG. 4 is a diagram of signal interchange between the user device and ticket issuing device, and FIG. 5 is a diagram of the user device when used for ticket redemption or checking.

FIG. 1 shows a display screen 1 of a user's mobile, handheld telecommunications device 100 with a display of a ticket image 2 in accordance with one embodiment of the invention. The digital ticket image 2 comprises a digital photo 3 of the person to whom the ticket is issued and ticket data 4,5. The ticket data 4,5 may comprise data on the issuer, identification data of the issued ticket such as a unique serial number, and/or validity information of the ticket such as period of validity or date of the event for which the ticket is issued. Some or all of the ticket data may be presented in graphical form, e.g. the data relating to the issuer may include a logo of the issuer, and identification data of the ticket may be presented also as a barcode.

The ticket 2 itself is a digital image and so can be protected by a digital watermark. In the example of FIG. 1, the ticket is protected by both a visible watermark W1 and an invisible watermark W2. As known in the art, a visible watermark is visible to the naked eye and may correspond to the appearance of a conventional watermark used on paper, whereas an invisible watermark may be carried by all or a major part of a digital image and is invisible to the naked eye. The invisible watermark is identified by digital processing of the image data.

The or each watermark may be configured in a number of different ways. In one embodiment, the digital photo in the ticket is protected with a visible watermark, which in a preferred embodiment of the invention is a logo associated with the issuer. In the FIG. 1 embodiment, the digital image ticket 2 is provided with one visible and one invisible watermark. The visible watermark may identify the issuer, e.g. the visible watermark may be the logo of the issuer, and the invisible watermark may carry ticket and/or issuer data, such as ticket validity data, date of issue data and/or identification data of the ticket, in its payload.

FIG. 2 illustrates a system for handling digital tickets according to the invention. The user's handheld device 100 is capable of communicating wirelessly with a ticket issuer 200 through a network 300 or by using a short-range wireless communication link such as Bluetooth, IrDA, or the like. The ticket is purchased using a payment system 400, which may comprise a credit card facility or a facility for charging the transaction to an account such as the user's phone bill.

FIGS. 3 and 4 illustrate the requesting of the ticket. The handheld device 100 may be provided with a digital camera 110 or other imaging device for taking pictures and storing them. Pictures are stored in a data store 120. The Nokia 7650 (TM) mobile phone has an integrated camera and thus might be suitable. The camera could instead be a separate device being capable of transmitting 1s pictures to the data store 120. The user device 100 may also receive pictures and graphical images either through the provided communications link(s) from a network 500 or directly from another terminal 600, e.g. using a wireless short-range link or a cable connection (USB or other similar connection). Alternatively, the device 100 may be provided with removable storage devices 700 for uploading pictures and/or images to the user's device.

The user selects a picture or an image from the data store 120 and transmits it from user device 100 to the ticket issuer 200 as part of a request for a ticket at step S1. Here, the user also communicates to the ticket issuer 200 data associated with the requested ticket. This data may comprise identification data of the user and/or the device 100, data concerning a requested validity of the ticket, data concerning the payment method (advance payment data, invoicing data etc.) and/or a reservation number (if used).

The ticket issuer 200 receives the request comprising the picture(s)/image(s), and other data. The ticket issuer 200 then at step S2 transmits to the user a template, which the user is requested to fill in. The user then fills in the template and transmits the completed template and the selected picture/image from the user device 100 to the ticket issuer 200 as one or several short message service (SMS) and/or multimedia message service BUS) messages illustrated by steps S3 and S4. Also payment data concerning payment for the ticket is transmitted at step S5. The ticket issuer 200 may in step S6 check the validity of all of some of the transmitted data.

Assuming that the checked data is satisfactory, the ticket is then created by the ticket issuer 200 at step S7. If watermarks are used, they are embedded into the picture/image. The ticket issuer may also process the received picture/image to make it compatible with the ticket issuing system, if deemed necessary. The ticket issuer may use templates for tickets and provide the templates also with visible and/or invisible watermarks. The processed picture/image and the template are combined with additional data at step 57 to generate a valid image is digital ticket for the ticket user, which is then sent to the user at step S8 or to an address or device, which the user has given.

Since the user can specify other addresses or devices, the user of the device 100 can order one or more tickets for sending to different recipients. Here the user has access to the pictures/images associated with other ticket users, which pictures/images are requested by the ticket issuer for issuing a ticket.

In FIG. 4, the ticket image data received from the ticket issuer 200 is shown on the user device's display screen 1 ready for use in redemption or checking.

The ticket image data is stored in the store 120 of the user device 100. The ticket may be stored as a single file containing the picture/image with the watermark(s). A major advantage of the invention is that everything is embedded into an image which works as an image ticket, and so there is no need for an extra process to handle links for displaying the ticket.

In simple cases, the checking of the displayed ticket image may be done by looking at the picture/image shown on the display 1. In one embodiment of the invention, some data relating to the ticket is shown in graphic form such as a barcode, which may be scanned from the display for added control.

In a more sophisticated system, the data relating to the ticket may be downloaded from the data store 120 in the user device 100 to a redemption and/or checking system 800 through a communications link 130. The communications link 130 may be a wireless short-range link, such as Bluetooth or IrDA, etc. The checking system 800 may check any watermarks in the image data or may perform other checks in the data.

When the ticket is redeemed or checked by the device 800, the ticket is shown on the display of the user's device 100 with all ticket data or a part of it. In one embodiment only the watermarked ticket image is shown in the display. In another embodiment, the watermarked ticket image is shown together with associated ticket data, preferably in graphical form such as plain text or a barcode. In this embodiment of the invention the redemption/checking device 800 may transmit back to the device 100 a message, which shows that the ticket is checked or redeemed. This message may replace the stored ticket data in whole or in part.

Many modifications and variations will be evident to those skilled in the art. Whilst the invention has been described in relation to a mobile telephone handset, it may be used with other devices such as personal digital assistants (PDAs), mobile computers and the like.

The invention claimed is:

1. A method of enabling an apparatus in a mobile communication environment to receive a digital ticket for obtaining rights to a service, the method comprising:
   transmitting a request for the digital ticket to a ticket issuer;
   receiving a template for the said digital ticket from the ticket issuer;
   filling the said template;
   transmitting the filled template to the ticket issuer;
   selecting a digital image from a first storage in the said apparatus;
   transmitting the selected digital image to the ticket issuer with a reference to the filled template; and
   receiving the digital ticket from the ticket issuer,
   wherein the digital ticket comprises the digital image, data from the filled template, ticket validity data, and ticket verification data.

2. The method of claim 1 wherein ticket verification data is embedded in the digital image by the ticket issuer as one or more watermarks.

3. The method of claim 2 wherein at least one of the watermarks is a visible watermark.

4. The method of claim 1 wherein the digital image is a digital image of the user of the apparatus.

5. The method of claim 1 wherein the received ticket is received as a multimedia message.

6. An article of manufacture comprising a computer readable medium containing program code, for enabling an apparatus in a mobile communication environment to receive a digital ticket for obtaining rights to a service, that configures the apparatus to:
   transmit a request for the digital ticket to a ticket issuer;
   receive a template for the said digital ticket from the ticket issuer;
   fill the said template;
   transmit the filled template to the ticket issuer;
   select a digital image from a first storage in the said apparatus;
   transmit the selected digital image to the ticket issuer with a reference to the filled template; and
   receive the digital ticket from the ticket issuer;
   wherein the digital ticket comprises the digital image, data from the filled template, ticket validity data, and ticket verification data.

7. An apparatus operable in a mobile communication environment, the apparatus comprising:
   a user interface for entering a request for a digital ticket;
   a transmitter configured to send the request for the digital ticket to a ticket issuer;
   a receiver configured to receive a template for the digital ticket as a response to the request;
   means for filling the received template;
   said transmitter being arranged to send the filled template to the ticket issuer;
   means for selecting an image from a first storage in the apparatus;
   said transmitter being arranged to send the selected image to the ticket issuer with a reference to the filled template;
   said receiver being arranged to receive the requested digital ticket from the ticket issuer,
   wherein the digital ticket comprises the image, data from the filled template, ticket validity data, and ticket verification data.

8. An apparatus operable in a mobile communications environment, the apparatus comprising:
   transmitter configured to:
     transmit a request, of a user, for a digital ticket to a ticket issuer, said ticket giving rights for receiving a service, wherein the ticket comprises:
       a digital image;
       user data from a filled template;
       ticket validity data; and
       ticket verification data,
     wherein the ticket issuer creates the digital ticket, and
     wherein the ticket issuer responds to the request by transmitting a ticket template to the user; and
   transmit the filled template and the digital image to the ticket issuer,
     wherein the ticket issuer transmits the created ticket to the or another user, and
     wherein the or another user receives and stores the digital ticket in their apparatus.

9. The apparatus of claim 8 wherein watermarking is visible.

10. The apparatus of claim 8 wherein watermarking is invisible.

11. The apparatus of claim 8 wherein the digital image is an image of the user.

12. The apparatus of claim 8 wherein the ticket comprises a multimedia message.

* * * * *